United States Patent [19]

Jain et al.

[11] Patent Number: 5,490,203
[45] Date of Patent: Feb. 6, 1996

[54] METHOD AND SYSTEM UTILIZING A LOCATION CACHING STRATEGY TO LOCATE NOMADIC USERS IN A COMMUNICATION SERVICES SYSTEM

[75] Inventors: Ravi K. Jain, Morristown; Charles N. Lo, Madison; Seshadri Mohan, Basking Ridge, all of N.J.

[73] Assignee: Bell Communications Research Inc., Morristown, N.J.

[21] Appl. No.: 97,148

[22] Filed: Jul. 26, 1993

[51] Int. Cl.⁶ ............................. H04M 11/00; H04Q 7/00
[52] U.S. Cl. .................. 379/59; 455/33.1; 455/54.1; 395/280; 379/58; 379/60
[58] Field of Search ................. 379/57, 58, 59, 379/60; 455/32.1, 33.1, 54.1; 395/200, 325

[56] References Cited

U.S. PATENT DOCUMENTS

| | | | |
|---|---|---|---|
| 5,123,111 | 6/1992 | Delony et al. | 455/34.1 |
| 5,197,092 | 3/1993 | Bamburak | 379/59 |
| 5,210,787 | 5/1993 | Hayes et al. | 379/60 |
| 5,274,845 | 12/1993 | Wang | 455/33.1 |
| 5,305,466 | 4/1994 | Taketsugu | 455/33.1 |
| 5,307,400 | 4/1994 | Sawyer et al. | 379/59 |
| 5,315,636 | 5/1994 | Patel | 379/58 |
| 5,329,573 | 7/1994 | Chang et al. | 379/58 |
| 5,353,331 | 10/1994 | Emery et al. | 379/58 |

OTHER PUBLICATIONS

Technical Report WINLAB–TR–35 "Querying in Highly Mobile Distributed Environments", T. Imielinski and B. R. Badrinath, Rutgers University, May 1992.

"Intelligent Network Requiremants for Personal Communications Services", Jonathan Homa and Steve Harris, IEEE Communications Magazine, Feb. 1992.

"An Estimate of Network Database Transaction Volume to Support Voice and Data Personal Communications Services", C. N. Lo, S. Mohan & R. S. Wolff.

*Primary Examiner*—Ken S. Kim
*Attorney, Agent, or Firm*—Leonard Charles Suchyta; James W. Falk

[57] ABSTRACT

Method and system for locating nomadic users in a personal communication services (PCS) system by utilizing two strategies for locating such users and a per-user criterion for determining which, if any, of the two strategies should be used. The method and system augment basic two-level strategies for locating users specified in IS-41 and GSM standards of PCS systems. One strategy utilizes forwarding pointers and the other strategy utilizes per-user location caching. One per-user criterion is a call-to-mobility ratio (CMR) which is the ratio of the average rate at which a user receives calls to the average rate at which the user moves. A variation of this criterion is the local CMR (LCMR) which is the ratio of the average rate at which a user receives calls from a given registration area, to the average rate at which the user moves. The method and system reduce the average time and overhead required to locate and deliver information to such nomadic users.

7 Claims, 7 Drawing Sheets

METHOD AND SYSTEM UTILIZING A LOCATION CACHING STRATEGY TO LOCATE NOMADIC USERS IN A COMMUNICATION SERVICES SYSTEM

TECHNICAL FIELD

This invention relates to methods and systems for locating nomadic users in a PCS system and, in particular, to auxiliary methods and systems for locating nomadic users in a PCS system.

BACKGROUND ART

Both time and communication overhead are required to locate and deliver information to users who move from place to place in personal communication services (PCS) systems. Such users are referred to as nomadic users.

Systems with nomadic users differ from cellular telephone systems in that as nomadic end users move, the communication services provided to them also move, but their terminal equipment need not. In particular, 1. Nomadic users are not restricted to accessing the communications network via wireless technology; they may use either wireline or wireless communication access technology as convenient.
2. Nomadic users may use different terminal equipment (or communication modes) at different locations in the system, including wireline fixed telephones, facsimile machines, pagers, laptop computers, etc., as well as cellular telephone devices.
3. The communications services available to nomadic users move with them, within the limitations of the communication mode chosen. For example, if a user subscribes to an information service which delivers both text and graphics, the text would be available as the user moves, but the graphics may not be available on some communication modes, e.g. pagers.

The combination of flexible communication modes and access technologies, and portable communications services, distinguishes systems with nomadic users from mobile cellular users.

Nomadic users receive calls via either wireless access or wired access through the Local Exchange Carrier (LEC) wireline network. If wireless access is used, it may be obtained through PCS Service Providers, which may subscribe to LEC PCS Access Services. In general, calls may deliver voice, data, text, facsimile or video information.

A location area or registration area is the location of a nomadic user as known by the wireline network. For users attached directly to a wireline network, the registration area is defined as the point of attachment. For users attached via wireless links, the situation is described as follows. In order to deliver calls by wireless links, the geographical region covered by a PCS network is divided into cells. Each cell is primarily served by one radio base station, although a base station may serve one or more cells. The base station locates a user and delivers calls to and from the user, by means of paging within the cell(s) it serves. Base stations are connected to the rest of the wireline network by wireline links. Cells are aggregated into larger geographical regions; from the point of view of the wireline network, the registration area of a wireless user is defined by the collection of cells in which the user is located. The size of the geographical region corresponding to a registration area may depend upon several factors including population density and PCS market penetration.

One type of PCS system is based on IS-41 or GSM standards and utilizes a signalling network similar to Signalling System 7 network. Studies have shown that, with predicted penetration levels of PCS in telephone exchange calling regions, there will be significant loads upon the signalling network and network databases, and that these loads are dependent upon the data management strategies adopted.

The basic strategy for locating nomadic users defined in the IS-41 standards document for North American cellular systems and the Bellcore PCS Network and Operations Plan is a two-level strategy. In a two-level strategy, each user is assigned to a specific database in the network, called its Home Location Register (HLR) which contains the user's profile, security information, and other data, as well as location information. Each registration area is served by a base station connected to a Mobile Switching Center (MSC), and each MSC, or set of MSC's, is served by a database called the Visited Location Register (VLR).

When a user u moves from registration areas i to j corresponding to MSCs, the MSC at j informs its VLR of user u's presence. If i and j are served by the same VLR, it records the new MSC serving u and takes no further action. Otherwise, the VLR decodes u's identification number and informs u's HLR. The HLR updates its information about u's location (registration) and also informs the VLR serving i, which deletes information about u (deregistration).

When a user u at registration area i attempts to locate user v and v is visiting registration area j, the MSC at i queries v's HLR, which in turn queries v's VLR. The VLR obtains specific location information from MSC j and returns it to the HLR, which in turn returns it to i; this information is sufficient to complete routing of the call.

SUMMARY OF THE INVENTION

An object of the present invention is to provide a method and system for reducing the loads placed upon signalling network and network databases by current user location strategies in a PCS system.

Another object of the present invention is to provide an auxiliary method and system for locating nomadic users in a PCS system by utilizing a per-user location caching strategy.

Still another object of the present invention is to provide an auxiliary method and system for locating nomadic users in a PCS system by utilizing both per-user location caching and forwarding pointers.

Still a further object of the present invention is to provide a method and system for locating nomadic users in a PCS system by utilizing both per-user location caching and forwarding pointer strategies and a call-to-mobility ratio (CMR) criterion for determining which of the two strategies, if any, should be used.

In carrying out the above objects and other objects of the present invention a method is provided for locating nomadic users in a Personal Communication Services (PCS) system having a plurality of registration areas wherein each user is identified with a home database and each registration area is identified with a visiting database. The method includes the step of collecting data based on the user's location in a first registration area obtained during a first PCS call to the user from a second registration area. The method also includes the steps of storing the data in a visiting database identified with the second registration area, detecting a second PCS call from the second registration area to the same user, and retrieving the data from the visiting database based on the second PCS call. The method further includes the steps of utilizing the data to determine if the user is still located in the first registration area, and if the user is still located in the first registration area, generating routing data to route the second PCS call to the first registration area.

Still further in carrying out the above objects and other objects of the present invention, a method is provided for locating nomadic users in a Personal Communication Services (PCS) system having a plurality of registration areas wherein each user is identified with a home database and each registration area is identified with a visiting database. The method includes the steps of collecting data based on the user's location in a first registration area obtained during a first PCS call to the user from a second registration area, storing the data in the home database and detecting movement of the user from the first registration area to a third registration area. The method also includes the steps of generating and storing a pointer in a visiting database identified with the second registration area. The pointer identifies the location of the user in the third registration area. The method further includes the steps of detecting a second PCS call, retrieving the data from the home database based on the second PCS call, utilizing the data to access the pointer in the visiting database of the first registration area, utilizing the pointer to determine the user's correct current location in the third registration area and generating routing data to route the second PCS call to the third registration area.

Preferably, each of the above methods includes the step of calculating a per-user criterion which is used in the methods.

Also, systems are provided for carrying out each of the above methods.

Per-user caching and per-user forwarding attempt to reduce the network signalling and database loads of the basic strategies in exchange for increased CPU processing and memory costs. Since technology trends are driving the latter costs down, deploying auxiliary strategies on a system-wide basis will become increasingly attractive. Once deployed, whether an auxiliary strategy should be invoked for a particular user is a function of the user's mobility and communications patterns.

The method and system of the present invention recognize that, in many cases, it should be possible to re-use the information about the user's location obtained during the previous call to that user. This information will be useful for those users who receive calls frequently relative to the rate at which they change registration areas. This idea attempts to exploit the spatial and temporal locality in calls received by users, similar to the idea of exploiting locality of file access in computer systems, and is thus essentially a form of caching.

The second auxiliary strategy caters to a different class of PCS users: those that move relatively frequently but receive few calls. Many of the registrations and deregistrations of these users are an unnecessary drain upon the network resources, particularly if they involve updating a distant home database via the signalling network. The method and system of the present invention also recognize that it should be possible to use localized information about these users' locations, maintaining a chain of forwarding pointers between visited databases, rather than updating the home database every time that the user changes registration areas.

Both auxiliary strategies are only beneficial for users with certain calling and mobility patterns. Several alternative architectures, forwarding strategies, and methods of estimating a user's call-to-mobility ratio (CMR) are provided to quantify the costs and benefits of using these strategies for PCS users.

The call-to-mobility ratio (CMR) of a user is the average number of calls to a user per unit time, divided by the average number of times the user changes registration areas, per unit time. A CMR is calculated for each user for purposes of this invention. A local CMR (LCMR) used herein is the average number of calls to a user from a given originating switch or registration area per unit time, divided by the average number of times the user changes registration areas, per unit time.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

The invention generally comprises a novel method and system for locating nomadic users and has three primary components: two location strategies and a decision criterion. The technique, like its location strategies, is called auxiliary because it augments the basic location strategy described in the Background Art portion of the specification.

PCS Network Architecture

Figure 1:
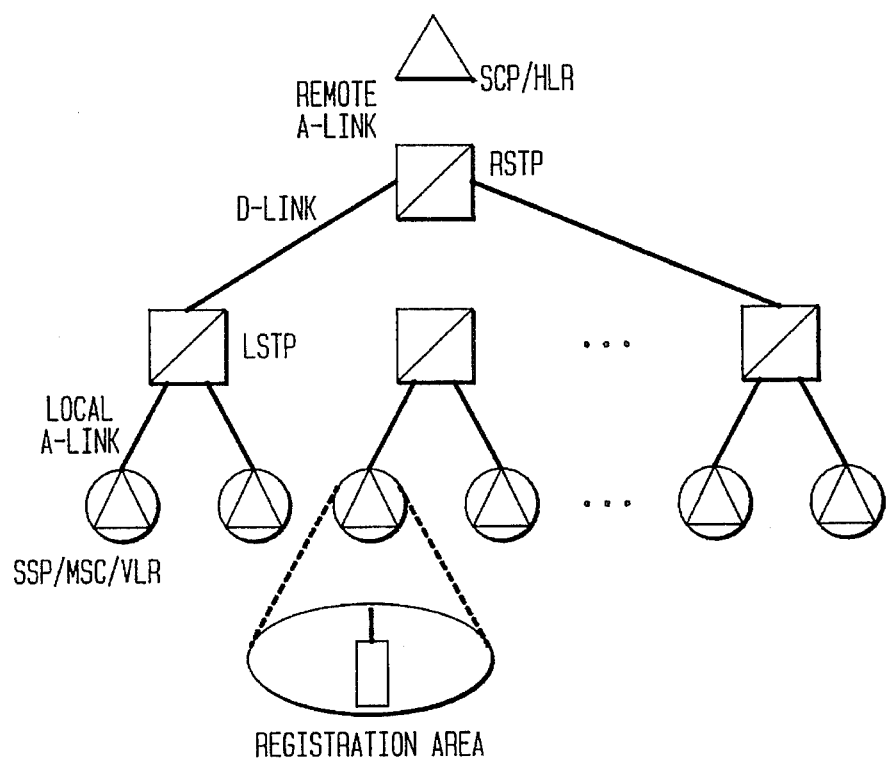
FIG. 1 is a schematic view of a reference CCS Network Architecture.

Referring to FIG. 1, there is illustrated a model of a common or reference CCS Network Architecture similar to the Signalling System 7 (SS7) network. This model, representative of the CCS network over an entire BCC region, assumes that the HLR (Home Location Register) resides in the SCP. A two-level hierarchy of STPs, comprised of a Regional STP (RSTP) connected via D-links to all Local STPs (LSTPs) in the region, performs message routing, translation (GTTs) and screening functions in the SS7 network. Each LSTP is in turn connected to multiple SS7-capable end office switches, or SSPs. (The term "switch" refers to an SSP unless otherwise indicated herein). In general, each LSTP comprises a Local Access And Transport Area (LATA) geographical area.

The SSP is assumed to have the functionality typically assumed with a Mobile Switching Center (MSC) (i.e., in functional terms, the MSC is assumed to be collocated with an SSP). In addition, a distinct VLR (Visitor Location Register) is associated with each SSP/MSC. This assumed physical integration of cellular and SS7 switching, and database functionalities, is not unreasonable. It is already anticipated that the VLR will be collocated with the MSC, and for direct future compatibility with SS7 signalling protocols, the MSC is likely to evolve to become an SPP.

The signaling network of FIG. 1 is used as a reference for deriving formulas for the costs of using various locating strategies. The costs considered are those associated with sending messages over the various links and switches of the signalling network and the costs of querying and updating the HLR and VLR. Typically, the costs will be evaluated in terms of the time required for these operations, although other measures could possible be used. Collectively, the communications and database costs are called signalling network costs.

For the remainder of this application, the terms switch, SSP and VLR will be used interchangeably, depending on the context, to refer to the network element which integrates the SSP, MSC and VLR functions. Each switch is assumed to serve exactly one registration area (RA), which is in turn comprised of one or more radio port coverage areas or cells.

Inter-exchange Carrier (IXC) or Hub STPs and their associated, connecting signalling links, are not shown in FIG. 1, since the signalling and database transaction activity described in this application involve only maintaining location information about moving subscribers and finding a called user within a telephone exchange calling region.

The relationship between the above reference architecture and the PCS Network and Operations Plan (NOP) is defined as follows:

1. In terms of the classification of PCS Access Services in the PCS NOP, this application addresses the CCS system signalling and database access costs associated with the PASN (PCS Access Services for Networks) configuration, where the PSP-N (PCS Service Provider-Network) is a mobile cellular network provider.

2. The CCS network architecture referenced in the PCS NOP is generic (i.e., Phase 1 and Phase 2 PAS descriptions include network elements such as SSP, STP and SCP, but do not illustrate hierarchical and interconnection details), so that the intelligent network platform(s) used to support PCS can be deployed over any particular network implementation. The quantitative analysis described herein is based on the specific network architecture described above.

3. In the PCS NOP, the Advanced Intelligent Network (AIN) switch which originates a call to a PCS user is associated with a serving SCP; that SCP may or may not contain the HLR for the called party. If it does not, a query for location information is launched from the serving SCP to the HLR. In the present application, the serving SCP is by default the only SCP in the entire service region (i.e., connected to the RSTP), and always contains the HLR of the called party.

4. In the PCS NOP, two types of SS7 Transaction Capabilities Application Part (TCAP) messages are defined in the network: 1) AIN TCAP for signalling between the AIN switch (SSP) and a database (HLR, VLR and SCP), and 2) IS-41 TCAP for signalling between databases (HLR, VLR and SCP). In the present application, since the SSP and VLR are collocated, there is no concern with the signalling message exchange between these entities, since that traffic does not traverse the CCS network. The signalling between HLR and VLR to support call and mobility management are assumed to be IS-41 TCAP.

Issues relating to the content of messages and other information (billing, etc.) which is transferred during a call are not addressed herein. For simplicity, it is assumed that message sizes are equal for different types of transactions (e.g., location request, registration and deregistration), for both query and update invocations as well as their associated response messages. Since only a comparative analysis of the basic strategy with and without the auxiliary strategies is performed herein, the conclusions will not be affected by this simplification.

Per-User Location Caching

The idea behind per-user caching is to try to avoid repeating the effort of locating a user for every call to that user from a given registration area.

When a user moves from one registration area to another, it updates its HLR as for the basic strategy. Consider a user at registration area i which attempts to locate user v, and assume v is currently at registration area j. Once v has been found, its location j is stored in a memory, called a cache, at registration area i. Subsequent calls from users at i to v read the cache and query the VLR at j. If v is still at j, there is a cache hit, and the VLR at j returns sufficient information to route the call. Otherwise, there is a cache miss, and the basic strategy is invoked to locate v, i.e., v's HLR is queried.

Clearly, caching is beneficial if the ratio of cache hits to misses, called the hit ratio, is high. A formula is derived herein for the minimum value of the hit ratio to make caching worthwhile, in terms of the signalling network costs. A formula is also derived herein to relate the hit ratio to the called user's LCMR, using a model for the user's calling and mobility pattern. The user's LCMR can thus be stored in memory at the caller's registration area, and used to determine if caching is worthwhile for that user. Alternatively, caching can be employed selectively at switches where the mean LCMR of originating calls is high enough.

The volume of SS7 message traffic and database accesses required in locating a called subscriber can be reduced by maintaining local storage, or cache, of user location information at a switch. At any switch, location caching for a given user should be employed only if the user receives a high volume of incoming calls relative to his/her mobility. The cached information is kept at the switch from which calls originate, which may or may not be the switch where the user is currently registered. More specifically, a minimum threshold LCMR value for that user should be exceeded to make caching worthwhile, and the benefits of using this strategy increases with the value of the LCMR.

Figure 2A:
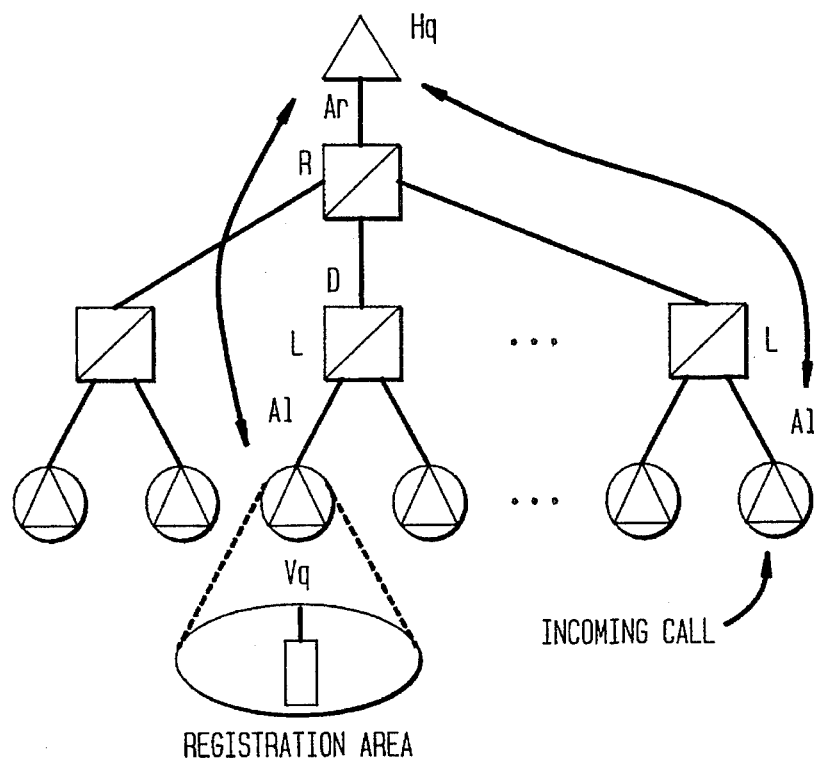
FIG. 2a is a schematic view illustrating a basic location strategy for use in the architecture of FIG. 1.
Figure 2B:
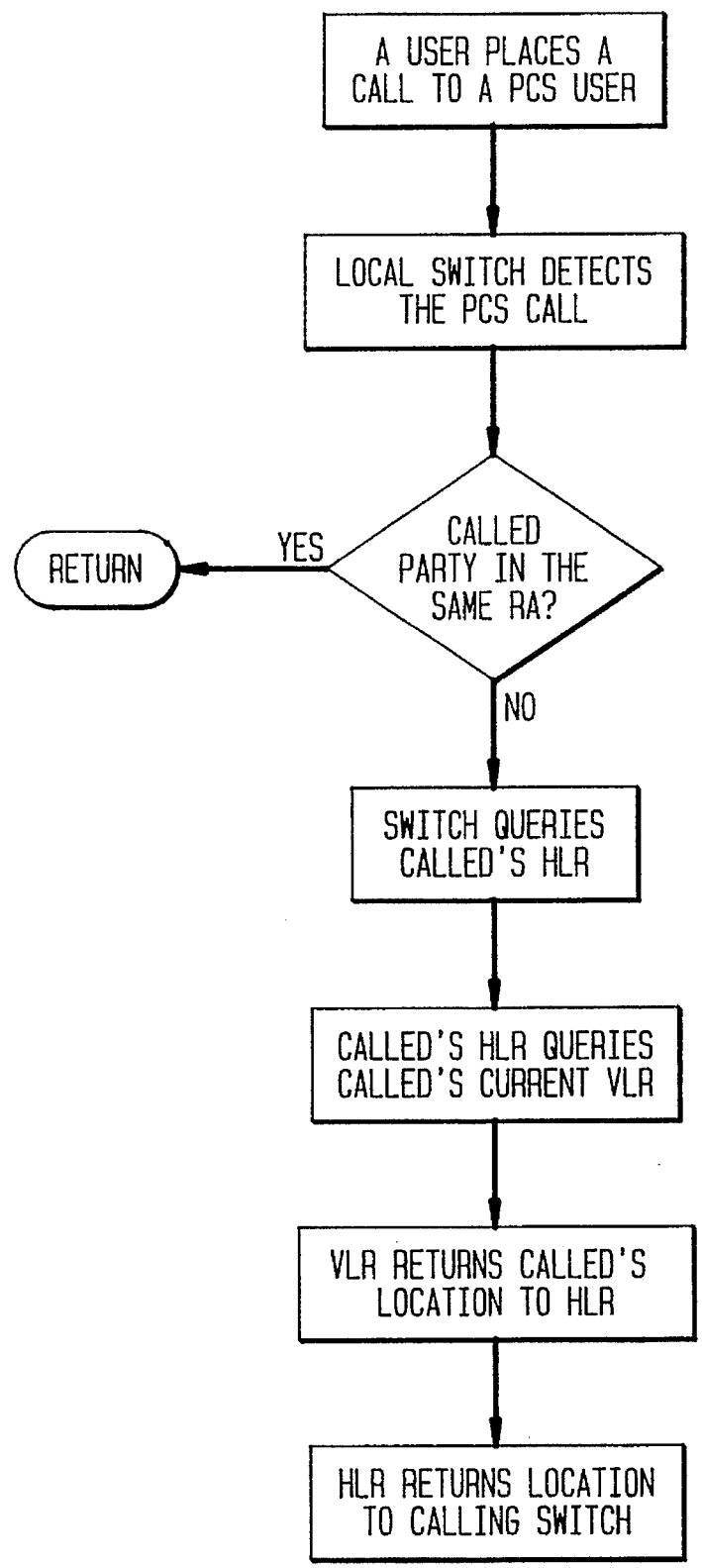
FIG. 2b is a block diagram flow chart illustrating the basic location strategy.

In this section, the benefits of caching relative to the basic strategy specified in IS-41 are quantified in terms of the reduced database accesses and signalling message traffic needed for obtaining routing information to enable call delivery to users. Location caching involves the storage of location pointers at the originating switch; these point to the VLR (and the associated switch) where the user is currently registered. The procedure of locating a PCS user is referred to as a FIND operation. In a basic FIND, or Basic_Find( ), i.e., one that follows the procedures specified in IS-41 to locate a "roaming" subscriber, the following sequence of steps takes place as illustrated in FIGS. 2a and 2b.

1. The incoming call to a PCS user is directed to the nearest switch.
2. Assuming that the called party is not located within the immediate RA, the switch queries the HLR for routing information.
3. The HLR contains a pointer to the VLR in whose associated RA the subscriber is currently situated, and launches a query to that VLR.
4. The VLR in turn queries the MSC to determine whether the user terminal is capable of receiving the call (i.e., is idle), and if so, the MSC returns a routable address to the VLR. This address is referred to as the Temporary Local Directory Number, or TLDN, in IS-41.
5. The VLR relays the routing address back to the originating switch via the HLR.

At this point, the originating switch can route the call to the destination switch.

Figure 3A:
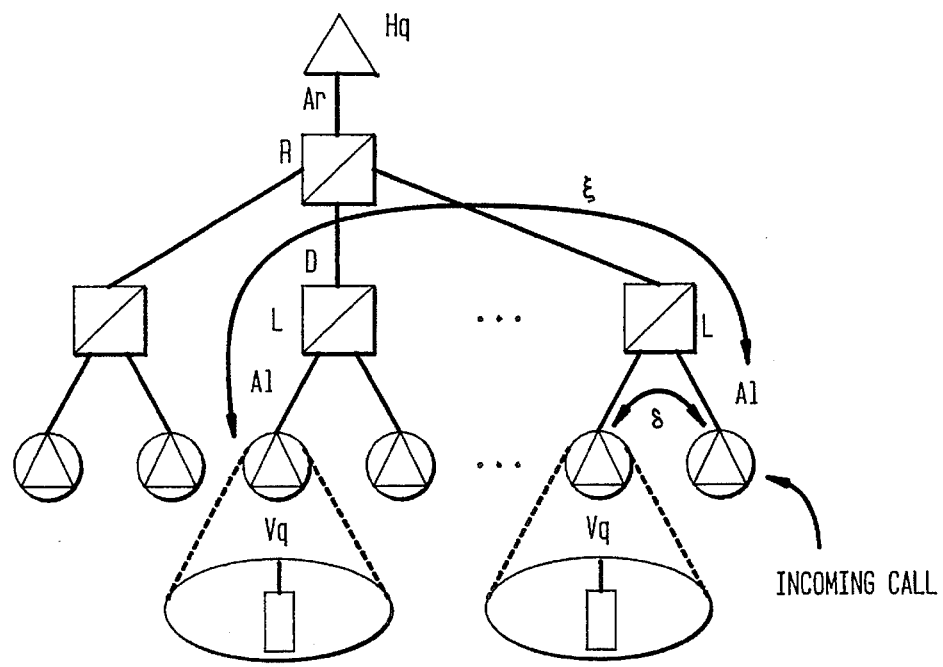
FIG. 3a is a schematic view illustrating a first location strategy of the present invention for use in the architecture of FIG. 1.
Figure 5A:
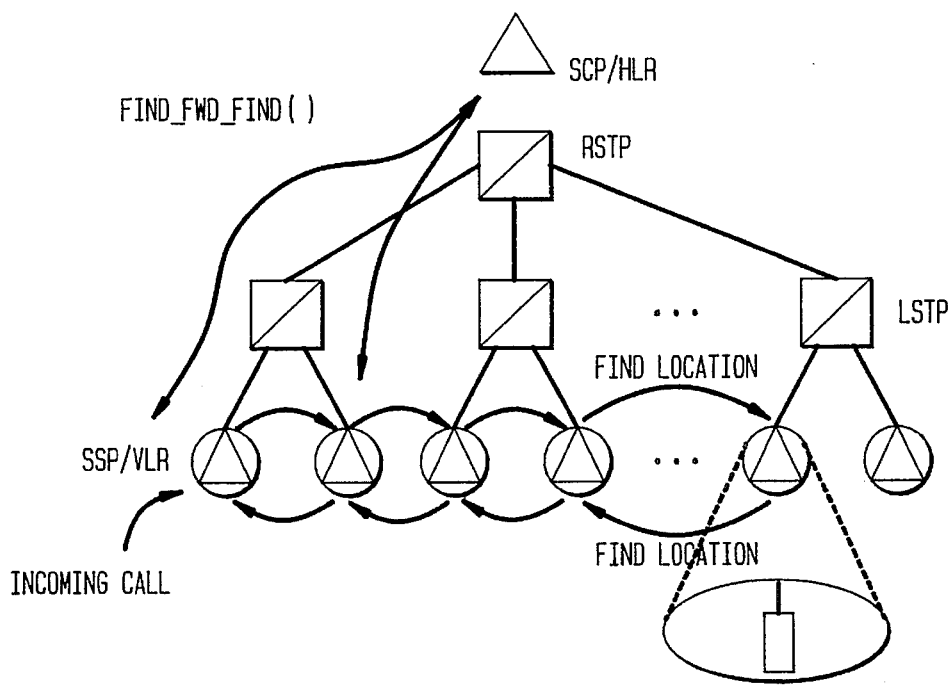
FIGS. 4a and 5a are respective schematic views illustrating a second location strategy of the present invention for use in the architecture of FIG. 1.
Figure 3B:
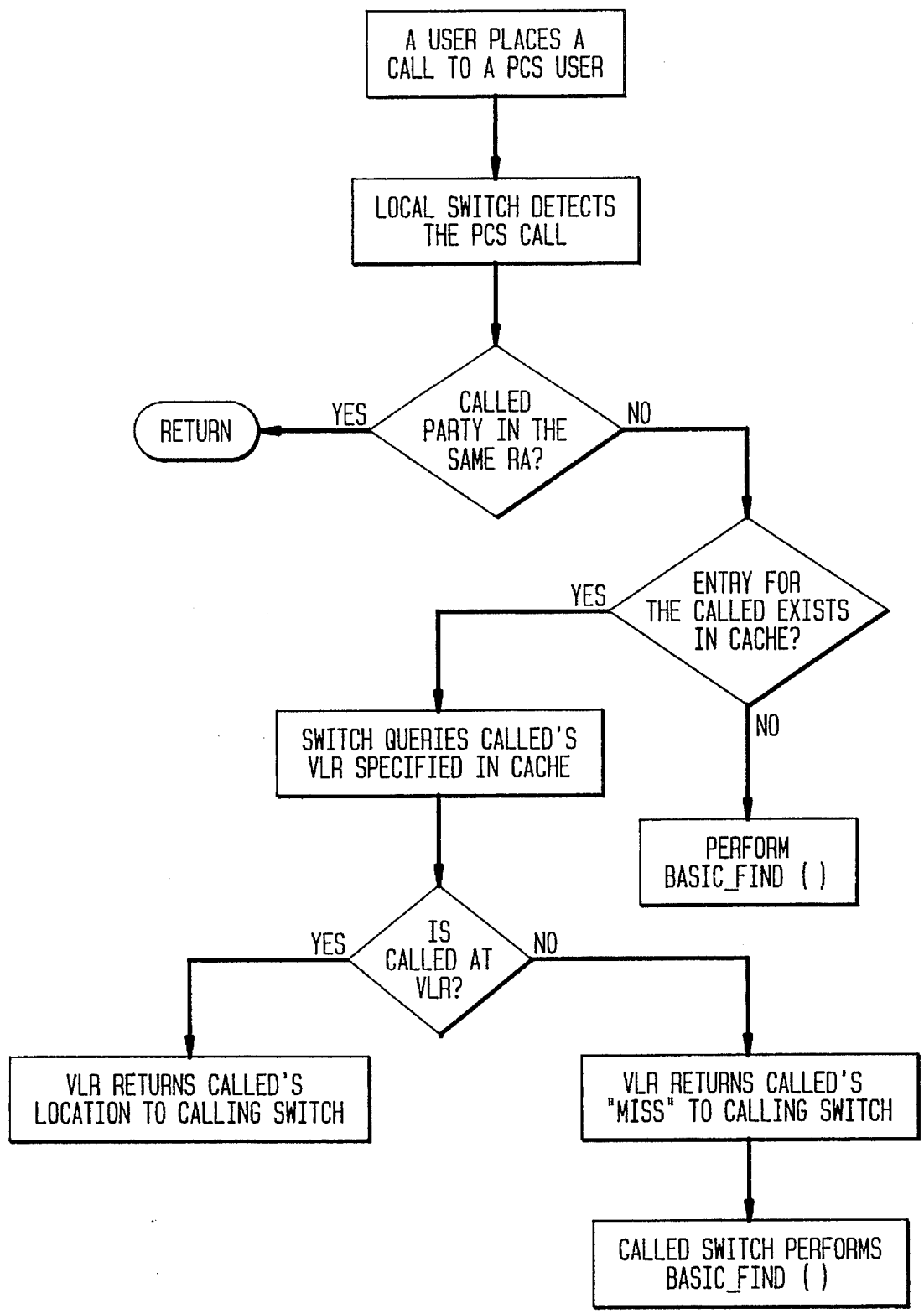
FIG. 3b is a block diagram flow chart illustrating the first location strategy which utilizes per-user location caching.

In the FIND procedure involving the use of location caching, or Cache_FIND( ), as illustrated in FIGS. 3a and 3b, each switch contains a local memory that stores location information for subscribers. When the switch receives a call origination (from either a wireline or wireless caller) directed to a PCS subscriber, it first checks its cache to see if location information for the called party is maintained. If so, a query is launched to the pointed VLR, which in turn furnishes the routing address. If not, Basic_FIND( ), as described previously, is followed.

If a cache entry exists and the pointed VLR is queried, two situations are possible. If the user is still registered at the RA of the pointed VLR (i.e. we have a cache hit), the pointed VLR returns the user's routing address. Otherwise, the pointed VLR returns a cache miss as illustrated in FIGS. 3a and 3b.

When a cache hit occurs, one query to the HLR is saved (a VLR query is involved in both Cache_FIND( ) and Basic_FIND( )), and traffic along some of the signalling links is also saved. There are also two messages sent along the link instead of four in Basic_FIND( ).

In steady state operation, the cached pointer for any given user is updated only upon a "miss". This caching strategy differs from that described in the prior art in that the prior art strategy maintains a copy of the user's service profile at the VLR to avoid downloading it repeatedly when a user moves. Thus, it aims to reduce the signalling impact of the MOVE operation rather than the FIND operation. In the present scheme, only a subset of the users is tracked by the cache. (This subset may be chosen as the subscribers who "qualify" based upon their long-term or monthly average LCMRs, for example). For each such user, the amount of savings is a function of the probability that the cached pointer points to the user's location, and increases with the user's LCMR. The hit ratio is defined as the relative frequency with which the pointer is correct when consulted. The overall network savings is the sum of the savings for individual users.

From FIG. 1, for Basic_FIND( ), the signalling network costs incurred in locating a PCS user in the event of an incoming call is given by:

$$\text{Cost}_{Basic\_FIND}=\text{Cost(query HLR)}+ \text{Cost (HLR query of pointed VLR)}=\alpha+\beta, \quad (1)$$

with $\alpha = 2(A_1+D+A_r+L+R)+H_Q$, and $\beta = 2(A_1+D+A_r+L+R)+V_Q$, and where $A_1$=Cost of transmitting a location request or response message on the A-link between SSP and LSTP, $D$=Cost of transmitting a location request or response message on the D-link, $A_r$=Cost of transmitting a location request or response message on the A-link between RSTP and SCP, $L$=Cost of processing and routing a location request or response message by LSTP, $R$=Cost of processing and routing a location request or response message by RSTP, $H_Q$=Cost of a query to the HLR to obtain the current VLR location, and $V_Q$=Cost of a query to the VLR to obtain the routing address.

In the following, a VLR is a local VLR if it is served by the same LSTP as the originating switch, and a remote VLR otherwise. For the Cache_FIND( ), the signalling network costs incurred in locating a user in the event of an incoming call is given by:

$$\text{Cost}_{Cache\_FIND}=\text{(hit ratio)} \cdot [\text{Cost (query local VLR)} \cdot \text{Prob(pointed VLR is local VLR)}+\text{Cost(query remote VLR)} \cdot (1-\text{Prob(pointed VLR is local VLR))}]+(1-\text{hit ratio}) \cdot [\text{Cost(query local VLR)} \cdot \text{Prob(pointed VLR is local VLR)}+ \text{Cost(query remote VLR)} \cdot (1-\text{Prob(pointed VLR is local VLR))}+ \text{Cost}_{loc,\ conv}+\text{Cost(cache update)}] = p[q\delta+(1-q)\epsilon]+(1-p)\ [q\delta+(1-q)\epsilon+\alpha+\beta+\eta]=\alpha+\beta+\epsilon+\eta-P(\alpha+\beta+\eta)+q(\delta-\epsilon), \quad (2)$$

WITH $P$=hit ratio $q$=Prob(pointed VLR is local VLR)

$\delta$=Cost (query local VLR)=$4A_1+2L+V_Q$ $\epsilon$=Cost (query remote VLR)=$4A_1+4D+4L+2R+V_Q$ $\eta$=Cost (cache update), For net cost savings, it is required that $\text{Cost}_{Cache\_FIND}<\text{Cost}_{Basic\_FIND}$, or that $$p > \frac{\epsilon+\eta+q(\delta-\epsilon)}{\alpha+\beta+\eta} = \quad (3)$$

$$\frac{4A_1+4D+4L+2R+V_Q+\eta-q(4D+2L+2R)}{4A_1+4D+4A_r+4L+4R+H_Q+V_Q+\eta}$$

To yield net savings, Equation (3) indicates that p, the cache hit ratio, must be greater than the threshold value given by the right-hand side of the equation. This is now related to the user's LCMR. Clearly, if LCMR$\leq$1, caching is never worthwhile. For LCMR>1, p and LCMR can be related as follows. After a user moves to a new RA, the first call to that user results in a cache miss, while the following LCMR−1 calls result in cache hits. Thus, $$p = \frac{LCMR-1}{LCMR}, \text{ i.e., } LCMR = \frac{1}{1-p},$$

so that an equivalent expression for Equation (3) is that:

$$LCMR > \quad (4)$$

$$\frac{4A_1+4D+4A_r+4L+4R+H_Q+V_Q+\eta}{2A_1+4A_r+2R+H_Q+q(4D+2L+2R)}$$

Equation (4) specifies the minimum LCMR value for a user, evaluated at a given switch, for which local maintenance of a cached location entry produces cost savings. As pointed out previously, a given user's LCMR value may be location dependent, since the rates of calls destined for that user may vary widely across switches.

The minimum threshold value for LCMR in Equation (4) is comprised of heterogeneous cost terms, i.e., transmission link utilization, packet switch processing, and database access costs. Therefore, numerical evaluation of the LCMR requires either detailed knowledge of these individual quantities or some form of simplifying assumptions. Based on the latter approach, two possible methods of evaluation may be employed:

1. Assume one or more cost terms dominate, and therefore Equation (4) can be simplified by eliminating insignificant terms, or
2. Establish a common unit of measure for all cost terms, for example time delay. In this case, $A_l$, $A_r$ and D may represent transmission delays of fixed transmission speed (e.g., 56 kb/s) signalling links L and R may constitute the sum of queuing and service delays of packet switches (i.e., STPs), and $H_Q$ and $V_Q$ the transaction delays for database queries.

With method 1, Equation (1) is insulated assuming a single form dominates. Table 1a shows the minimum LCMR's to obtain net cost savings for each customer in which one of the cost terms is dominant.

TABLE 1a

Minimum LCMRs For Various Individual
Dominant Signalling Network Cost Terms

| Dominant Cost Term | Minimum LCMR |
| --- | --- |
| $A_l$ | 2 |
| $A_r$ | 1 |
| D | 1/q |
| L | 2/q |
| R | 2/q |
| $H_Q$ | 1 |
| $V_Q$ | ∞ → no solution |
| η | ∞ → no solution |

In Table 1a, if the cost of querying a VLR or of updating the cache is the dominant cost, caching for users who may move is never worthwhile, regardless of users' call reception and mobility patterns. This is because the load on the VLR and the cache is always increased, since any move by a user results in a cache miss. On the other hand, for a fixed user (or telephone), caching is always worthwhile.

If the local and remote A-links or HLR querying are the bottlenecks, caching is worthwhile even for users with very low LCMRs.

Several values for LCMR in Table 1a involve the term q, the probability that the pointed VLR is a local VLR. These values may be numerically evaluated by simplifying assumptions. For example, assume that all the SSPs in the network are uniformly distributed amongst L LSTPs. Also, assume that all the PCS subscribers are uniformly distributed in location across all SSPs, and that each subscriber exhibits the same incoming call rate at every SSP. Under these conditions, q is simply 1/L. Given that there are a total of 160 LATAs across the 7 BCC regions, the average number of LATAs, or L, is 160/7 or 23. With q=1/L≈0.04, Table 1b extends the results of Table 1a.

TABLE 1b

Minimum LCMRs For Various Individual
Dominant Cost Terms, with q = 0.04, q = 0.25

| Dominant Cost Term | Minimum LCMR (q = 0.04) | Minimum LCMR (q = 0.25) |
| --- | --- | --- |
| $A_l$ | 2 | 2 |
| $A_r$ | 1 | 1 |
| D | 25 | 4 |
| L | 50 | 8 |

TABLE 1b-continued

Minimum LCMRs For Various Individual
Dominant Cost Terms, with q = 0.04, q = 0.25

| Dominant Cost Term | Minimum LCMR (q = 0.04) | Minimum LCMR (q = 0.25) |
| --- | --- | --- |
| R | 50 | 8 |
| $H_Q$ | 1 | 1 |
| $V_Q$ | ∞ → no solution | ∞ |
| η | ∞ → no solution | ∞ |

The assumption that all users receive calls uniformly from all switches in the network is extremely conservative. In practice, one would expect that user call reception patterns display significantly more locality, so that q would be larger and the minimum LCMRs required to make caching worthwhile would be significantly smaller. It is also worthwhile to consider the case of a BCC region with PCS deployed in a few regions only, a likely initial scenario, say 4 LATAs. In either case, the value of q would be significantly higher; the second column in Table 1b shows the minimum LCMR when q=0.25.

In both the basic and location caching strategies, intra-LATA signalling activities for obtaining location information can be performed solely over the BCC CCS network without requiring intermediate forwarding by an IXC CCS network. A possible exception is if the user is served by a VLR not connected to the CCS network. However, in performing subsequent call set-up routing procedure over the CCS network, the IXC CCS network must be employed for inter-LATA signalling.

Per-User Forwarding

The basic idea behind per-user forwarding is to avoid unnecessary CCS messaging traffic, and updates of a user's HLR, if the user moves across RAs relatively frequently but receives calls relatively infrequently.

Two operations which incur signalling are defined:
1. MOVE, in which the PCS user moves from one RA to another, and
2. FIND, as defined in the previous section.

Figure 4A:
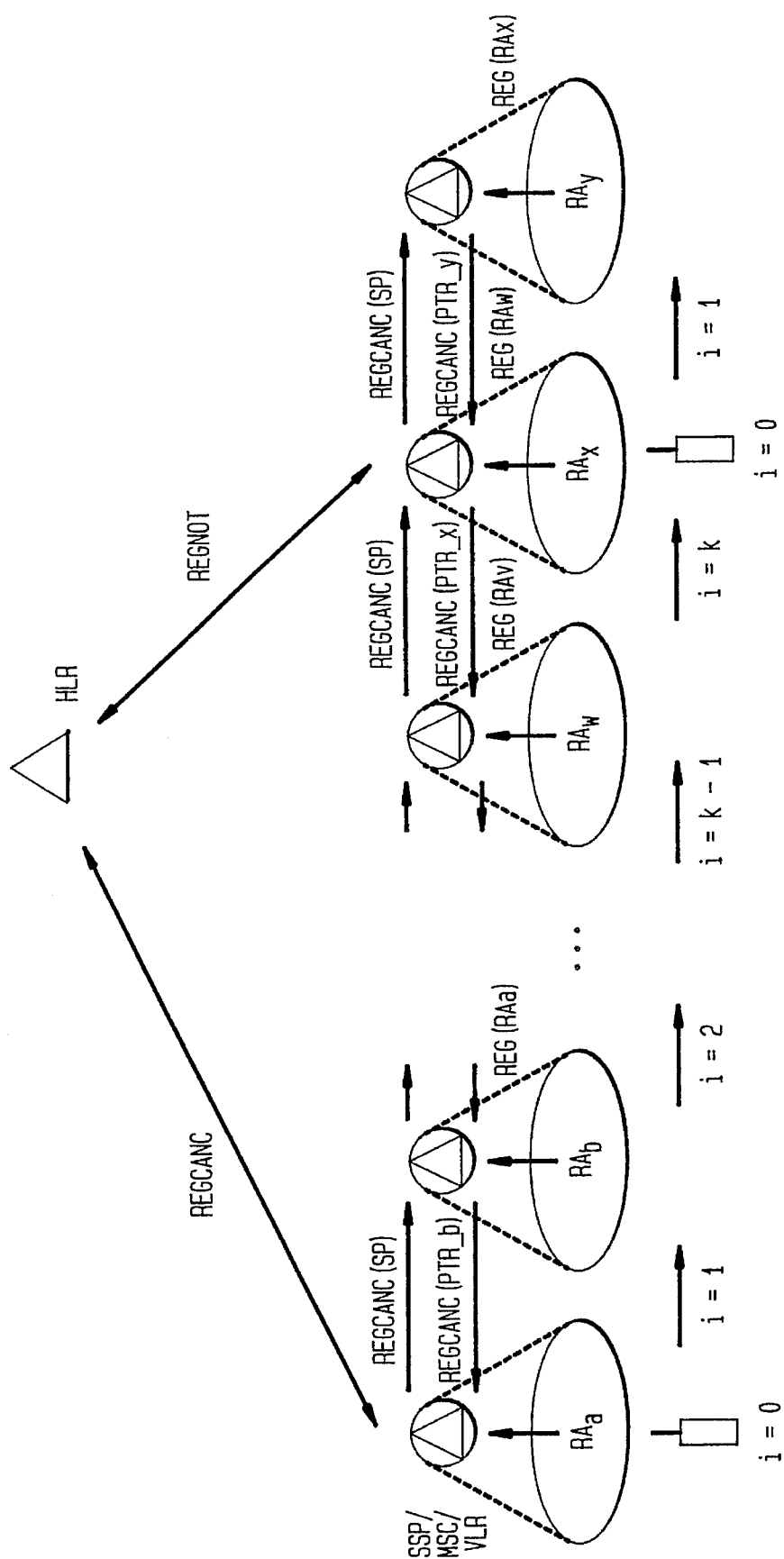
Figure 4B:
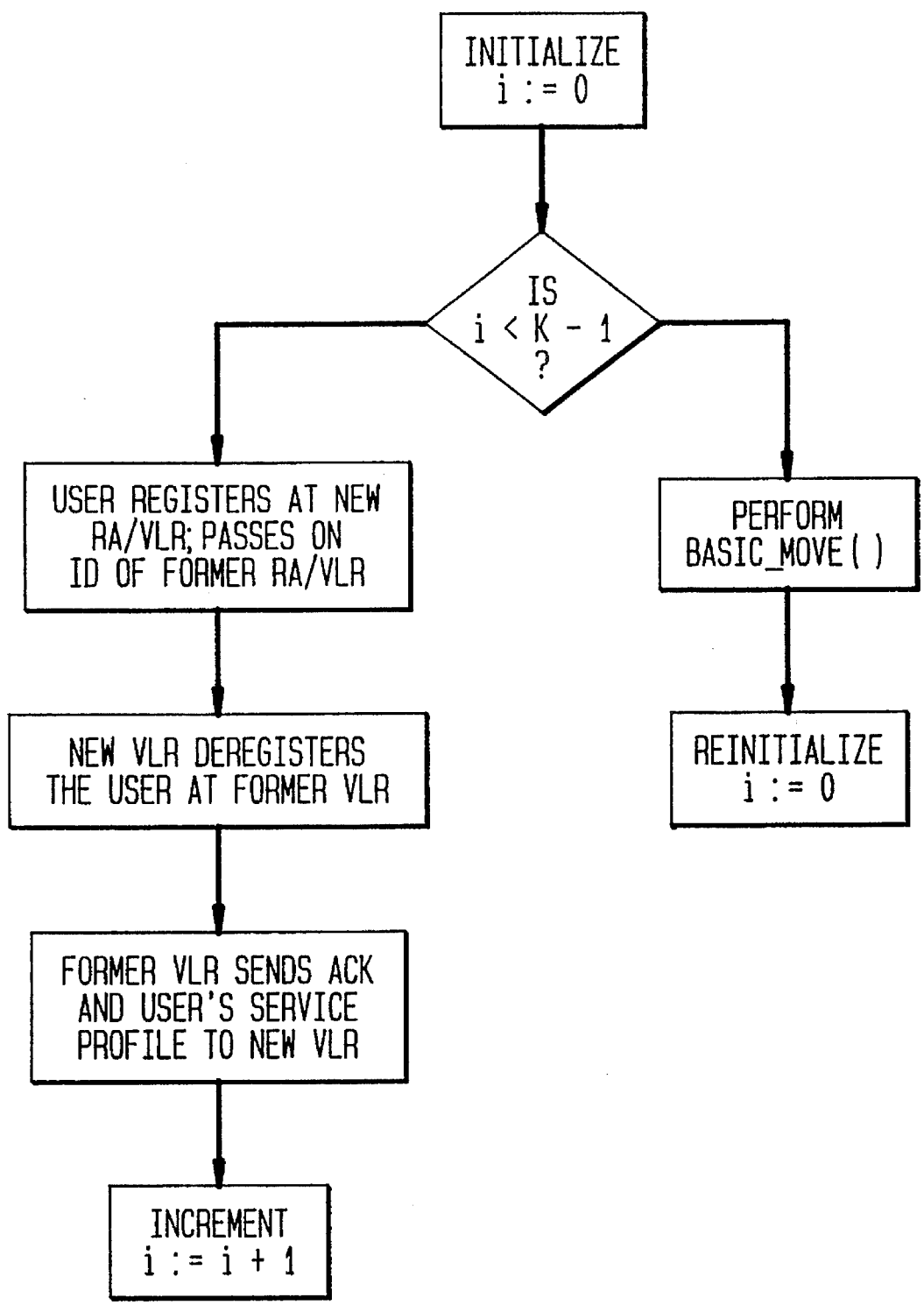
FIGS. 4b and 5b are respective block diagram flow charts illustrating the second location strategy which utilizes forwarding pointers.

Referring now to FIGS. 4a and 4b, when a user u moves from RAa to RA b, it informs the switch at the new RA, b, of the RA from which it arrived.

The switch at the new RA determines whether to invoke the basic MOVE or the forwarding MOVE strategy. The former is referred to as Basic_MOVE( ), and the latter as Fwd_MOVE( ). In Fwd_MOVE( ), switch b exchanges messages with switch a to set up a forwarding pointer from a to b, but does not invoke u's HLR. A subsequent call to u from some other switch will incur a query to u's HLR as in the basic strategy, and obtains an outdated pointer to a. The pointer from a to b is then followed to determine u's correct current location.

The benefits of forwarding depend on the user's CMR, how long the chain of forwarding pointers is allowed to get, and the probability that a user's move takes it outside a region served by an LSTP. To quantify the benefits and costs associated with forwarding, the same CCS reference model is used as for the caching strategy. However, while in the case of caching, only the FIND operation was affected, in forwarding both FIND and MOVE are affected, making the analysis somewhat more complicated.

In the forwarding strategy, the reduced load on the HLR is obtained in exchange for increased load on the VLRs, and reduced traffic on the D-links and RSTP is obtained in exchange for increased traffic at lower levels of the CCS network. Thus, the forwarding strategy serves to redistribute the load to portions of the network where excess capacity may be more likely to exist (e.g. SSP and A-links). This is in contrast to the caching strategy, where every cache hit results in a net savings by avoiding a query to the HLR and avoiding traversing links and switches at the higher levels of the signalling network.

Figure 5B:
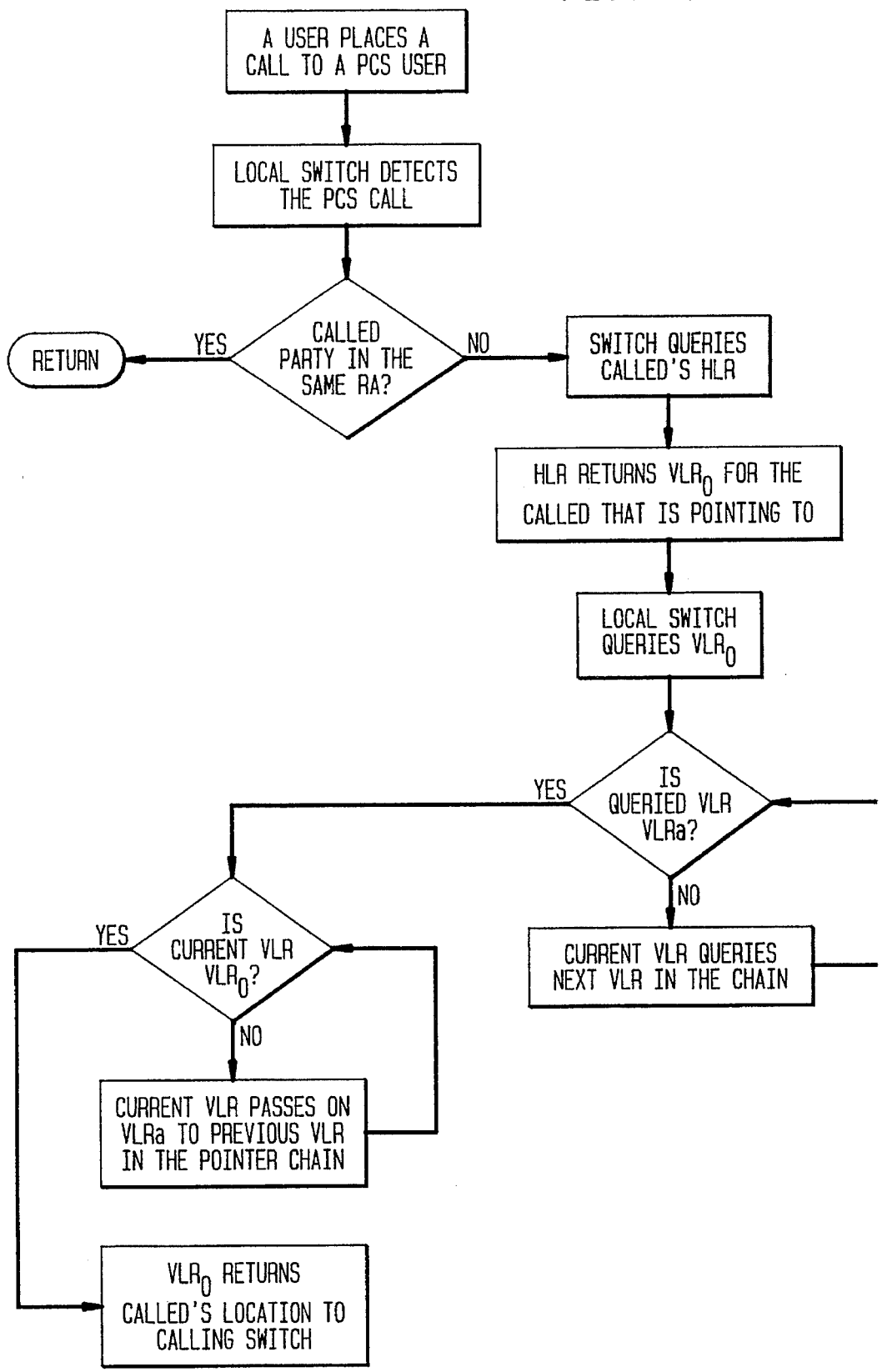

The new MOVE and FIND operations, i.e., Fwd_MOVE( ) and Fwd_FIND( ), are illustrated in FIGS. 4b and 5b, respectively. After every K moves, the called's HLR is updated instead of continuing the forwarding pointer chain. This is called "breaking the chain." Also, $VLR_0$ denotes the VLR pointed by the called user's HLR, and $VLR_Q$ denotes the called user's actual current VLR.

The Fwd_MOVE( ) procedure requires that the user's equipment inform the new VLR of the registration area from which the user just arrived.

From FIG. 1, the cost for Fwd_FIND( ) depends upon whether the originating switch shares the same LSTP as the switch/VLR indicated by the called's HLR (which in turn may not necessarily reflect the called's actual location). If not, the originating switch must query the pointed VLR via the RSTP. Also, if the called party moves outside its LSTP area frequently, searching for its current location will also involve following forwarding pointers via the RSTP frequently. To quantify this behavior, some parameters are introduced herein.

Let t=Prob (called user's location according to HLR is in caller's LSTP area)

s=Prob (any given MOVE by the user is within its current LSTP area)

j=average number of forwarding pointers traversed to locate a user, per FIND

The cost of a Fwd_FIND( ) is denoted by F' and that of a Basic_FIND( ) by F; the former can be calculated by evaluating the Fwd_FIND( ) algorithm line-by-line, as follows:

$$F' = A_I + L + D + R + A_r + H_Q +$$
$$A_I + L + D + R + A_r + 2A_I + L +$$
$$(1-t)(L + 2D + R) + V_Q +$$
$$j[2A_I + L + (1-s)(L + 2D + R) + V_Q] +$$
$$j[2A_I + L + (1-s)(L + 2D + R)] +$$
$$2A_I + L + (1-t)(L + 2D + R)$$

In this expression, it is assumed that when the called's current location is returned to the caller's switch, i.e., along the "return path", the VLR is not queried and that if the user has performed a Basic_MOVE ( ) the HLR has been informed. Collecting terms, one has:

$$F'(6+4j)A_1+[4+2j(2-s)]L+[2+4(1-t)+4j(1-s)]D+[2+2(1-t)+2j(1-s)]R+2A_r+H_Q+(1+j)V_Q \quad (5)$$

A Fwd_FIND( ) is always at least as costly as a Basic_FIND( ). It is straightforward to show that the difference is given by:

$$\Delta F \equiv F' - F = (2+4j)A_1+2j(2-s)L+[2(1-2t)+4j(1-s)]D+[2j(1-s)-2t]R-2A_r+jV_Q \quad (6)$$

The average cost of a Fwd_MOVE( ) is calculated, taking into account that one out of every K Fwd_MOVE( ) is the same as a Basic_MOVE( ). Let M be the cost of a Basic_MOVE( ), and M' that of Fwd_MOVE( ). Also, let $V_u$ and $H_u$ denote the costs of updating a VLR and an HLR, respectively.

$$M' = \left(\frac{K-1}{K}\right)[V_u + 2A_1 + L + (1-s)(L + 2D + R) + \quad (7)$$
$$V_u + 2A_1 + L + (1-s)(L + 2D + R)] + \frac{M}{K}$$

In this expression, it is assumed that the user's profile and other necessary information are part of the acknowledgement received by the new VLR. The benefit of Fwd_MOVE( ) over Basic_MOVE( ) is denoted as $\Delta M$, and it can be shown that:

$$\Delta M = M - M' = \quad (8)$$
$$\left(\frac{K-1}{K}\right)[2sL + 4sD + 2(1+s)R + 4A_r + H_u]$$

A Fwd_MOVE ( ) is always less costly than a Basic_MOVE ( ). For there to be a net benefit, the excess cost of Fwd_FIND ( ) over Basic_FIND ( ), over all calls received by the called party, has to be less than the benefit of Fwd_MOVE ( ) relative to Basic_MOVE ( ), i.e., the called party should receive calls relatively infrequently. If, to a given called party the ratio of Fwd_FIND( )'s per Fwd_MOVE( ) is CMR, it is required that $\Delta M - CMR \cdot \Delta F > 0$, or $$CMR < \frac{\Delta M}{\Delta F} = \quad (9)$$
$$\frac{\left(\frac{K-1}{K}\right)[2sL + 4sD + 2(1+s)R + 4A_r + H_U]}{(2+4j)A_1 + 2j(2-s)K + [2(1-2t) + 4j(1-s)]D + [2j(1-s) - 2t]R - 2A_r + jV_Q}$$

In order to get an intuitive understanding for this formula, one considers situations for which only one of the cost terms above dominates, and calculate the costs and benefits of Fwd_MOVE( ) and Fwd_FIND( ).

TABLE 2a

Cost/Benefit Evaluation of Forwarding For Various Dominant Cost Terms

| Dominant Term | $\Delta M$ | $\Delta F$ | Comments |
|---|---|---|---|
| $A_1$ | 0 | $(2 + 4j)A_1$ | Never use Forwarding |
| L | $2(K - 1)sL/K$ | $2j(2 - s)L$ | See Following |
| D | $4(K - 1)sD/K$ | $(2 - 4t + 4j - 4js)D$ | See Following |
| R | $2(K - 1)(1 + s)R/K$ | $2(j - js - t)R$ | See Following |
| $A_r$ | $4(K - 1)A_r/K$ | $-2A_r$ | Always use Forwarding |
| $H_u$ | $(K - 1)H_u/K$ | 0 | Always use Forwarding |
| $V_Q$ | 0 | $jV_Q$ | Never use Forwarding |

In three of the situations above, it is not clear if forwarding is worthwhile or not. To investigate this, it is necessary to make additional assumptions, namely to quantify s and j. If one assumes that calls arrive to the called party uniformly as the called party moves, and there are at most K moves before the chain of forwarding pointers is broken, then an average Fwd_FIND( ) will involve traversing half the length of the chain, i.e., j=(K−1)/2.

To estimate s, one needs a model of the called's mobility across LSTP areas. The following simple model is used.

Assume that an LSTP area consists of m×m RA's arranged in a square, and each RA is itself a square. Users are assumed to be uniformly distributed throughout the LSTP area. Furthermore, each time a user leaves an RA, it crosses one of the four sides with equal probability. Then, Prob(user crosses an LSTP area boundary)= Prob(user is in border RA of LSTP area)× Prob(user movement crosses LSTP area boundary)= 1/m.

Thus, under these assumptions, s=1−1/m. A value is estimated for m for a typical BCC region. There are 160 LATA over all seven BCC regions, and typically there are 1250 SSP per BCC region. Assuming one LSTP per LATA, the number of SSPs per LSTP is 1250×7/160. Now, assuming each SSP corresponds to a single RA, $$m = \sqrt{1250 \cdot 7/160} \approx 7.4,$$

and therefore s≈0.87. Using these estimates for j and s, one can investigate the cases when L, D or R is the dominant cost.

TABLE 2b

Cost/Benefits Evaluation Of Forwarding With Simplifying Assumptions

| Dominant Term | ΔM | ΔF |
|---|---|---|
| L | 1.74(K − 1)L/K | 1.13(K − 1)L |
| D | 3.48(K − 1)D/K | (1.74 + 0.26K − 4t)D |
| R | 3.74(K − 1)R/K | (0.13K − 0.13 − 2t)R |

Conditions When Auxiliary Strategies Are Beneficial

The present invention uses the CMR and LCMR to determine, for each user, whether the caching or forwarding auxiliary locating strategies should be used. When a user moves, the MSC at its new location uses forwarding providing the user's CMR is below a certain threshold; this threshold is defined by a formula. When the user is to be located, the MSC at the caller's registration area uses caching provided the called party's LCMR is above a certain threshold; this threshold is also defined by a formula. It is unlikely that a user will both have a high enough LCMR as well as a low enough CMR that both auxiliary strategies would be invoked; if this does occur, it may result in an increased call setup time but no calls will be dropped. It is quite possible, however, that neither would be used, in which case the basic strategy alone will be invoked.

Both auxiliary strategies are promising when the HLR update or query load, or the remote A-link, is the performance bottleneck; for forwarding this is always the case, while for caching a reasonably low LCMR (LCMR>1) is required. For caching, the total database load and signalling network traffic is reduced whenever there is a cache hit. For forwarding, on the other hand, load and traffic is redistributed from the HLR and higher-level SS7 network elements (RSTP, D-links) to the VLRs and lower levels where excess network capacity may be more likely to exist. Both strategies essentially distribute the functionality of the HLR to the VLRs. By the same token, if the VLR is the performance bottleneck, neither strategy is promising unless the VLR capacity is upgraded.

The benefits of both auxiliary strategies depend upon user call and mobility patterns when the D-link, RSTP, and LSTP are the performance bottlenecks. Under extremely conservative assumptions, for caching to be beneficial requires high LCMRs (25–50); it is expected that in practice, this threshold could be lowered significantly (i.e. LCMR<8). On the other hand, for reasonable CMRs (CMR<0.5), forwarding can provide benefits regardless of user call and mobility patterns. If pointer chains are kept short (K<5), forwarding is beneficial up to much higher ceilings on CMR.

Thus, it appears that when the D-link, RSTP or the LSTP are the bottlenecks, caching and forwarding (with appropriate choice of K) could potentially provide benefits to large classes of users.

Using a simple average case calculation, consider the net network benefit of caching when HLR access and update is the performance bottleneck. Consider a scenario where u=30% of PCS users receive c=80% of their calls from s=5 RAs where their LCMR> 1, and s'=4 of the SSPs at those RAs contain sufficiently large caches. Assume that the average LCMR for these users is l=5, i.e., the hit ratio is p=1−1/l=80%, so that 80% of the HLR accesses for calls to these users from these RA are avoided. Then the net saving in the accesses to the system's HLR is H=u c s' p/s=15%.

Alternative Network Architectures

The reference architecture assumed as illustrated in FIG. 1 is only one of several possible architectures. It is possible to consider variations in the placement of the HLR and VLR functionality, (e.g., placing the VLR at a Local SCP associated with the LSTP instead of at the SSP), the number of SSPs served by an LSTP, the number of HLRs deployed, etc. It is quite conceivable that different LECs will deploy different signalling network architectures as well as placement of databases for supporting PCS within their serving regions. It is also possible that the number and placement of databases in a network will change over time as the number of PCS users increases.

Rather than consider many possible variations of the architecture, a reference architecture is selected to illustrate the new auxiliary strategies and the method of calculating their costs and benefits. Changes in the architecture may result in minor variations in this analysis but will not affect its qualitative conclusions.

User Terminal Capabilities For Forwarding

The Fwd_MOVE( ) procedure requires that the user terminal inform the new VLR of the registration area from which the user just arrived. This capability is required to establish a forward pointer, and is not needed with Basic_MOVE( ). These points related to this process are stressed.

1. The user terminal equipment must have the capability of storing this information. Such a capability is implicitly required in the terminal registration procedure specified in the PCS Network and Operations Plan, explicitly mentioned in the Wireless Access Communications Systems (WACS) Technical Advisory, as well as required in the European GSM standard.

2. The user terminal equipment need not use SS7 point codes or other SS7 address information for this purpose. In PCS, the radio port periodically broadcasts a registration area identifier which can be used for this purpose.

3. Current air interface protocols do not support the relaying of this information to the network. Thus, new protocols (new messages or message elements) would have to be designed to support the relaying of this information.

It thus seems clear that this capability is not a new burden imposed upon the user terminal equipment, and does not require disseminating SS7 related information to the terminal equipment.

Alternative Forwarding Strategies

The forwarding strategy is a complicated procedure and numerous variations of it can be envisioned. Here, some of the variations are briefly sketched.

One set of issues deals with making the Fwd_FIND( ) procedure more efficient. One possibility is that when a caller tries to locate a user, it first queries the local VLR to see if a forwarding pointer is available for this user; this would eliminate a query of the called user's HLR. A second possibility is that once a Fwd_FIND( ) procedure locates the actual VLR of the called user, this information is stored, either at the called user's HLR or at the caller's VLR, for use in subsequent call deliveries to the same user. A third possibility is to prevent loops from being created in the forwarding chain by ensuring that, during FWD_MOVE( ), the VLR at the new RA is checked to see if an outgoing pointer already exists for this user; if so, it is deleted and no forwarding pointer from the old RA need be set up.

A second set of issues deals with deleting or updating the chain of forwarding pointers. Thus, when the reverse path is being traversed during a Fwd_FIND( ), the pointers encountered at switches along the way could be (atomically) updated to point to the new VLR of the called user. The motivation for this would be to avoid incorrect pointers that could be misused by rogue processes in the switch or during a switch failure. It is not clear that the presence of incorrect pointers during switch failure or recovery would make the user location more vulnerable to errors than other types of errors that could occur in such a situation.

Most of these variations would not alter the method of quantitative analysis presented herein, or the qualitative conclusions drawn herein.

Estimation Of The CMR and LCMR

Some methods of estimating the CMR and LCMR are described herein. A simple and attractive policy is to not estimate these quantities on a per-user basis at all. For instance, if the average LCMR over all users in a PCS system is high enough (and from Table 1, it need not be very high), then caching could be used at every SSP to yield net system-wide benefits. Alternatively, if it is known that, at any given SSP, the average LCMR over all users is high enough, a cache can be installed at that SSP. Other variations can be designed.

One possibility for deciding about caching on a per-user basis is to directly calculate a running average of the per-user hit ratio at each calling SSP, instead of the LCMR. Such calculations would involve a negligible computation overhead. Another possibility is to maintain information about a user's calling and mobility pattern at the HLR, and download it periodically to selected SSPs during off-peak hours. It is easy to envision numerous variations on this idea. Finally, various cache management policies can be designed; a simple policy is to discard the least recently used cache entries when the cache overflows (LRU). There are also several possible ways of deciding about using forwarding for a called user. Once again, long-term averages of CMR could be downloaded to selected SSPs during off-hours. More dynamic schemes can be also designed. If both caching and forwarding are deployed in a PCS system, it is possible that for some users both may be invoked simultaneously.

Conclusions

Two auxiliary strategies are described herein to augment the basic user location strategy proposed in the Bellcore PCS Network and Operations Plan and the North American IS-41 cellular standard. For a given PCS system architecture, the criteria under which the two strategies produce reductions in the network signalling and database loads in terms of users' CMRs have been quantified herein. Depending upon the numbers of PCS users who meet this criteria, the system-wide impacts of these strategies could be significant. The particular values of these criteria will change with variations in the way the PCS architecture and the auxiliary strategies are implemented, but the general approach described herein can still be applied.

While the best mode for carrying out the invention has been described in detail, those familiar with the art to which this invention relates will recognize various alternative designs and embodiments for practicing the invention as defined by the following claims.

What is claimed is:

1. A method for locating nomadic users and completing calls to said users in a communications system by utilizing a per-user location caching strategy, said system having a switching center with which is associated a home database to which said users are assigned, a plurality of end offices for a plurality of registration areas, and visiting databases for said end offices, each registration area being assigned to and served by one of said visiting databases, said method comprising the steps of collecting data identifying the serving visiting database for a first registration area in which a user is located, said identifying data being obtained during the process of locating the user for a first call to the user from a second registration area, storing the identifying data in a second visiting database serving a second registration area, detecting a second call to the same user from the second registration area, and completing the call to the user by retrieving the data identifying the first visiting database from the second visiting database based on the identity of the user, utilizing the retrieved data to query the second visiting database to determine if the user is still located in the first registration area, and, if the user is still located in the first registration area, generating routing information to route the second call to the first registration area.

2. The method for locating nomadic users and completing calls in accordance with claim 1 wherein the step of completing the call further comprises, if the user is not still located in the first registration area, obtaining the identify from the home database of the visiting database serving the registration area where the user is then located.

3. The method for locating nomadic users and completing calls in accordance with claim 1 further comprising the step of calculating a call-to-mobility ratio for the user, said ratio being the ratio of an average rate at which the user receives calls from the second registration area to an average rate at which the user moves between registration areas, said step of completing the call to the user using the caching strategy if the call to mobility ratio exceeds a predetermined value.

4. (to replace claim 19) The method for locating nomadic users and completing calls in accordance with claim 3 further comprising the step of storing said call-to-mobility ratio in the visiting database assigned to and serving the second registration area.

5. A system for locating nomadic users and completing calls in a Personal Communications Services (PCS) system by utilizing a per-user caching strategy, said system having a switching center with which is associated a home database to which users are assigned, a plurality of end offices for a plurality of registration areas in which a nomadic user may be located, and visiting databases for said end offices, each registration area being assigned to and served by one of said visiting databases, said system comprising means for collecting data identifying a serving visiting database based on a user's location in a first registration area, said identifying data being obtained during the process of locating the user for a first PCS call to the user from a second registration area, means for storing the identifying data in a visiting database serving a second registration area, means for detecting a second PCS call to the same user from the second registration area, and means for completing the call to the user by retrieving the data identifying the first visiting database from the second visiting database based on the identity of the user utilizing the retrieved data to query the second visiting database to determine if the user is still located in the first registration area, and, if the user is still located in the first registration area, generating routing information to route the second PCS call to the first registration area.

6. The system for locating nomadic users and completing calls in accordance with claim 5 further comprising means for calculating a call-to-mobility ratio for the user, said ratio being the ratio of an average rate at which the user receives PCS calls from the second registration area to an average rate at which the user moves between registration areas, said means for completing the call to the user being responsive to said call-to-mobility ratio exceeding a predetermined value.

7. The system for locating nomadic users and completing calls in accordance with claim 6 further comprising means for storing said call-to-mobility ratio in the visiting database identified with the second registration area.

\* \* \* \* \*